United States Patent [19]

Seewaldt

[11] Patent Number: 5,487,782
[45] Date of Patent: Jan. 30, 1996

[54] ELECTROSTATIC SPRAY COATING DEVICE FOR ELECTRICALLY CONDUCTIVE, NON-COMBUSTIBLE COATING FLUID

[75] Inventor: Kurt Seewaldt, Dietzenbach, Germany

[73] Assignee: ITW Oberflachentechnik GmbH, Dietzenbach, Germany

[21] Appl. No.: 159,677

[22] Filed: Nov. 30, 1993

[30] Foreign Application Priority Data

Dec. 1, 1992 [DE] Germany ............... 42 40 328.6

[51] Int. Cl.⁶ ................................................ B05B 5/00
[52] U.S. Cl. .................... 118/621; 118/50.1; 118/300; 239/690; 239/706; 239/708
[58] Field of Search ................. 118/50.1, 621, 118/300; 239/690, 706, 708; 361/228

[56] References Cited

U.S. PATENT DOCUMENTS

| | | | |
|---|---|---|---|
| 3,791,579 | 2/1974 | Cowan | 118/621 |
| 3,865,079 | 2/1975 | Kellams et al. | 118/621 |
| 3,892,357 | 7/1975 | Tamny | 118/629 |
| 3,896,994 | 7/1975 | Walberg | 239/3 |
| 3,929,286 | 12/1975 | Hastings et al. | 118/621 |
| 3,971,337 | 7/1976 | Hastings | 118/629 |
| 4,209,134 | 6/1980 | Coffee | 239/690 |
| 4,413,788 | 11/1983 | Schaefer et al. | 239/3 |
| 4,884,745 | 12/1989 | Spongh | 239/691 |
| 4,932,589 | 6/1990 | Diana | 239/3 |
| 5,100,690 | 3/1992 | Planert et al. | 239/3 |
| 5,335,854 | 8/1994 | Seitz et al. | 118/621 |

FOREIGN PATENT DOCUMENTS

| | | |
|---|---|---|
| 0050444 | 4/1982 | European Pat. Off. ........ 118/300 |
| 1325266 | 8/1973 | France . |
| 2128455 | 3/1974 | Germany . |
| 2937890 | 12/1981 | Germany . |
| 3526013 | 10/1986 | Germany . |
| 3609509 | 9/1987 | Germany . |
| 3932623 | 5/1990 | Germany . |
| 4106074 | 4/1992 | Germany . |
| 285086 | 4/1971 | U.S.S.R. . |
| 1655295 | 6/1992 | U.S.S.R. . |

*Primary Examiner*—Laura Collins
*Attorney, Agent, or Firm*—Dvorak and Traub

[57] ABSTRACT

An electrostatic spray coating device for electrically conductive, non-combustible coating fluid. The coating fluid is accommodated in a pressure container (2) of electrically insulating plastic and connected over a tube (10) of electrically insulating material with a spraying device (8). An electric conduction path (53) heads off high voltage from the coating fluid (6) which is present in the pressure container (2) when the high voltage is switched off. Thereby the electrical capacitance of the device is reduced and simultaneously it is ensured that after the switching-off of the high voltage the coating fluid present in the pressure container (2) in a few seconds is no longer electrically charged. Thereby, immediately after the switching-off of the high voltage, the pressure container (2) can be opened, for example for the replenishing of coating fluid.

10 Claims, 2 Drawing Sheets

ELECTROSTATIC SPRAY COATING DEVICE FOR ELECTRICALLY CONDUCTIVE, NON-COMBUSTIBLE COATING FLUID

The invention relates to an electrostatic spray coating device for electrically conductive, non-combustible coating fluid.

BACKGROUND OF THE INVENTION

The electrostatic spray coating device according to the invention is suited especially for electrostatic hand spray pistol with which electrically conductive coating fluid, especially so-called water-varnish (Wasserlack) is spray onto objects from a varnish pressure vessel.

From the state of the art determined by the German Patent Office:

| | |
|---|---|
| SU | 16 55 295 A3 |
| US | 39 71 337 |
| DE | 36 09 509 A1 |
| DE | 39 32 623 A1 |
| SU | 2 85 086 |
| US | 39 29 286 |
| DE-OS | 21 28 455 |
| DE | 41 06 074 A1 |

A varnish pressure vessel of metal is known from DE-PS 34 40 38I C2. The known varnish pressure vessel is electrically conductive through its metal and must, therefore, be placed on an insulating table. The coating fluid is atomized by the spraying device, for example a hand spray pistol, and electro-statically charged with a voltage between 10 kV and 140 kV. There electromagnetic field lines are formed between the spraying device and the object to be coated, along which the powder particles fly onto the object. Since the coating fluid, for example water-varnish, is electrically conductive, over the coating fluid also the varnish pressure vessel is charged with high voltage. So that the varnish pressure vessel charged with high voltage cannot be contacted, either a fence of metal must be build around the varnish pressure vessel at a distance of approximately 2 m um (sic) of the varnish pressure vessel, or the varnish pressure vessel must be set up in a separate space. In both cases, either in the fence or to the separate space doors must be provided with safety switches which on opening of the doors interrupt the current feed to a high-voltage generator for the generation of high voltage and ground the whole high-voltage system over a separating grounding switch. A coating cabin provided with such safety switches or grounding switches is known from DE-PS 35 26 013 C1. From DE-PS 29 37 890 C3 there is known a device for the feed of an electrically conducting varnish with an intermediate storage unit of electrically insulating material, into which the electrically conducting coating fluid is fed for the interruption of the electric voltage path. The intermediate storage unit consists of polyethylene and has an inset of metal which by the high voltage of a spraying device atomizes and electrostatically charges, is likewise charged through the coating material which is fed over a tube to the spraying device. This state of the art shows that the "kickback" ("Zurückschlagen") of the high voltage of the spraying arrangement from the spraying device back through the electrically conducting coating fluid into the coating fluid feed system is a great problem, which the specialist had already attempted to solve in many ways.

In the known electrostatic spray devices for electrically conducting varnishes the varnish pressure vessel, the spray pistol and the tube through which the varnish flows from the varnish pressure vessel to the spray pistol form an electric capacitance. Especially when around the metal varnish pressure vessel the necessary perpetration protection (Begehungsschutz) is built of grounded metal grid fencing (Metallgitterzeun), we are dealing, through the dielectric, with air with a strong capacitor action, which drastically increases the total capacitance of the system. This capacitance can generate on the spray nozzle of the spray pistol a strong electrical discharge from the spray nozzle to an operating person. It is a matter here of the discharge that an operating person can draw upon himself if he holds his or her hand on the spray nozzle during the varnishing process. There the maximally admissible 350 mJ for personnel protection can be exceeded.

SUMMARY OF THE INVENTION

By the invention there is to be solved the problem, in the case of electrostatic spray coating devices for electrically conductive, non-combustible coating fluid, of avoiding an electric capacitance troublesome or dangerous for humans.

This problem is solved according to the invention.

The invention is suited for electric high voltages of a few kV to more than 140 kV.

The advantages of the invention lie in that an electric capacity dangerous for humans is avoided; that the device is simple and economical, that for the pressure container no secured space or grounded metal grid fence with protective devices, such as, for example, end switches on the entry door and high voltage separating grounding switches are required; that the pressure container does not have to be placed on an insulating table; that the pressure container which consists of electrically insulating material, preferably of plastic, has no capacitance of its own. That is a very substancial difference with respect to the known pressure vessels of electrically conducting metal.

BRIEF DESCRIPTION OF THE DRAWINGS

The invention is described in the following with reference to the drawings with the aid of preferred forms of execution as examples.

DESCRIPTION OF THE PREFERRED EMBODIMENT

Figure 1:
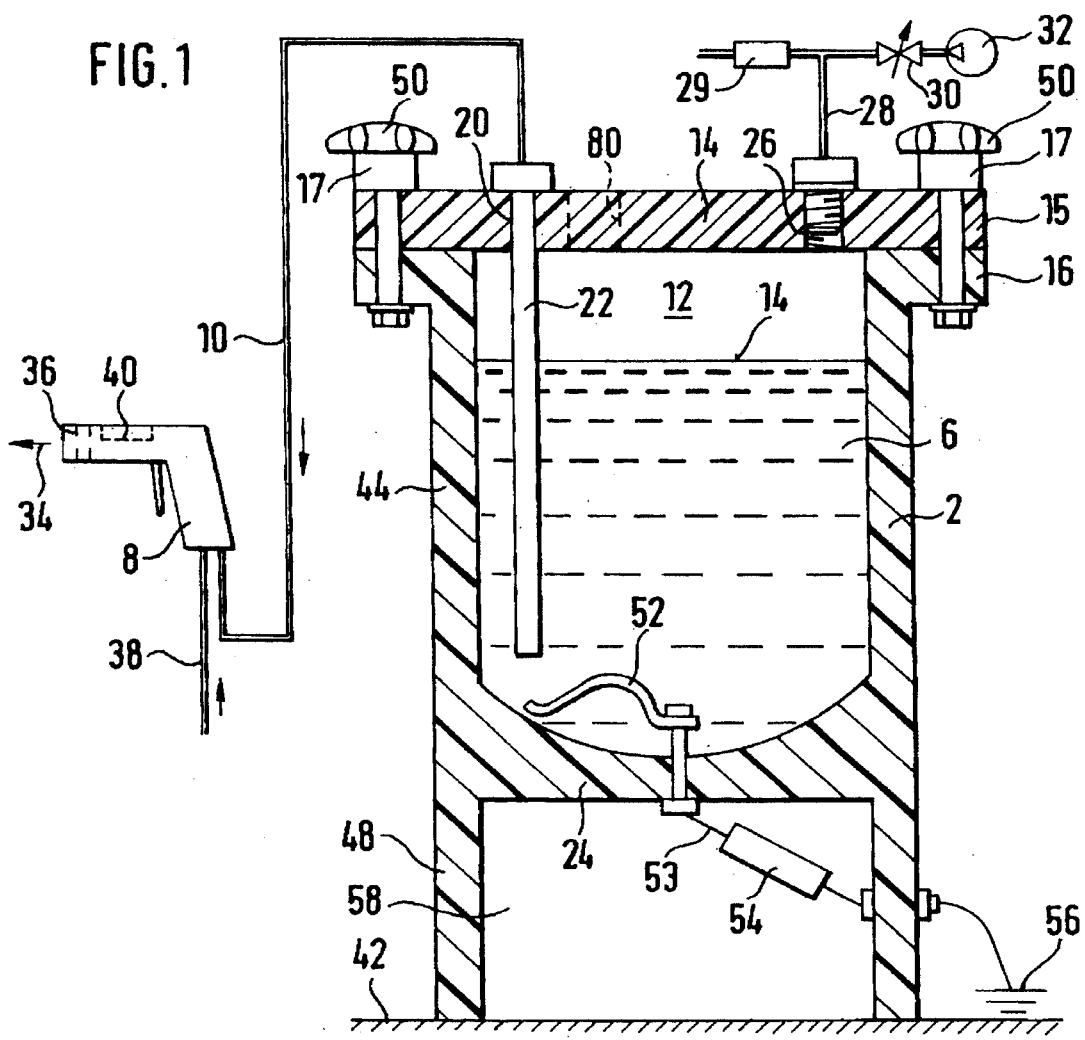
FIG. 1 shows the electrostatic spray coating device according to the invention with a pressure container in vertical section along the plane I—I in FIG. 2, FIG. 2 a plan view of the pressure container of FIG. 1, FIG. 3 a further form of execution of an electrostatic spray coating device according to the invention, in which a pressure container similar to that of FIG. 1 is represented in vertical section, FIGS. 4, 5 and 6 three different variants of an electrical line path of the spray coating devices of FIGS. 1, 2 and 3.
Figure 2:
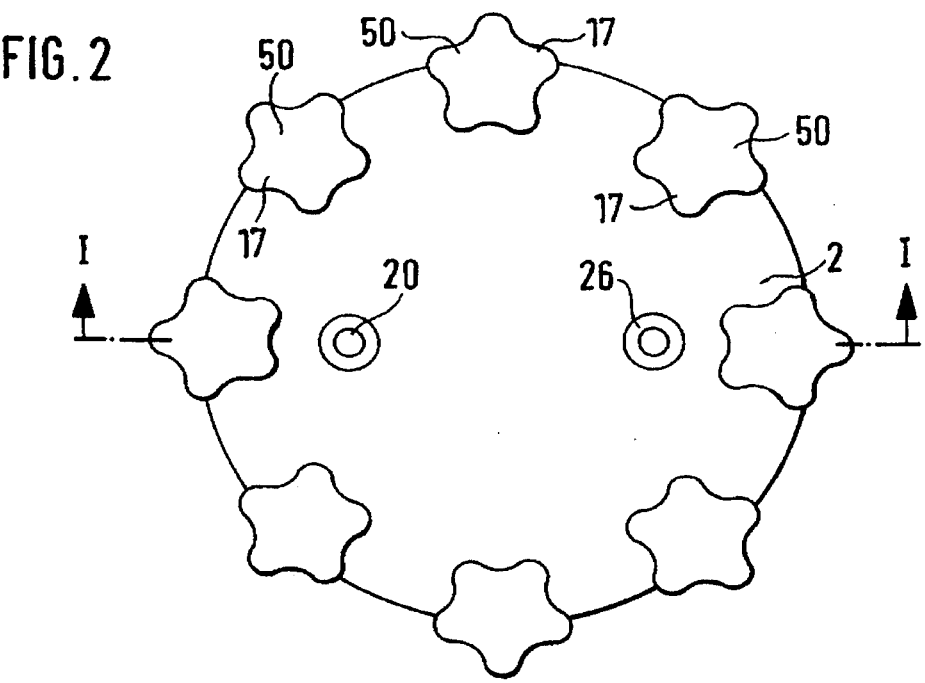

The electrostatic spray coating device represented in FIGS. 1 and 2 according to the invention contains a pressure-tight closed pressure container 2, which is filled up to an upper filling level 4 with electrically conductive, non-combustible coating fluid 6, for example with water varnish, a spraying device 8 for the atomizing and electrostatic charging of the coating material 6, and a tube 10 for the feed of the coating fluid 6 from the pressure container 2 to the spraying device 8. The tube 10 consists of electrically insulating material and an outer mantle of electrically conductive plastic, which is connected to ground potential. The pressure container 2 has on its upper side an opening 12, through which it can be filled up to the upper filling level 4. A container cover 14 is seated compressed airtightly on the edge of the filling opening 12 of the pressure container 2 and is detachably connected with the container 2 over flanges 15 and 16 as well as tension screws 17. In the container cover 14 there is formed a fluid outlet 20, which has a connecting tube 22 which plunges into the pressure container 2 and into the coating fluid 6 contained therein up to close to the container bottom 24 and is connected with its upper end fastened to the container cover 14 with the tube 10 for flow. In the container cover 14 there is provided, further, a compressed air inlet 26 above the minimal filling level 4, which is connected by a compressed air tube 28 over an adjustable pressure regulator 30 to a compressed air source 32. Downstream of the pressure regulator 30 there is present on the pressure tube 28 an excess pressure valve 29. The compressed air of the compressed air source 32, with open pressure regulator 30, drives coating fluid 6 from the pressure container 2 through the connecting tube 22 and its flexible tube 10 to the spraying device 8 and from this in the form of a spray jet 34 onto an object to be coated. The spraying device 8 atomizes the coating fluid 6. The spraying device 8 can, in correspondence to FIG. 1, be a hand pistol. It contains electrodes 36 for the electrostatic charging of the coating fluid before and/or after the atomizing of this coating fluid. For the atomizing process either the pressure of the compressed air source 32 can suffice or an additional compressed air line 38 can be connected to the spraying device 8. The high-voltage generator 40 for the generation of the high voltage for the electrodes 36 can be arranged according to FIG. 1 inside the spraying device 8 or outside of it. The high voltage can amount to between several 1000 V and up to over 140,000 V. A usual value is approximately 40,000 V. Since the coating fluid 6 is electrically conducting, it conducts the high voltage from the electrodes 36 of the spraying device 8 through the tube 10 and through the fluid outlet 20 with the connecting tube 22 into the pressure container 2. So that nevertheless no short circuit arises, so that, further, no danger is present of electric flash-overs onto persons or animals, and so that the container can safely be set up also on a conducting base 42, for example a table of electrically conducting material, all the parts of the spray coating device in which coating fluid 6 is present consist of electrically insulating material. In particular, the container wall 44, the container bottom 24, a switch base 48, the container cover 14, the compressed air inlet 28 and the fluid outlet 20 with the connecting tube 22, the tube 10 and the compressed air tube 28 consist of electrically insulating material. Preferably also the heads 50 of the screws 17 consists of electrically insulating material. The electrically insulating material has in all parts a thickness such that it shields the high voltage of the electrostatically charged coating fluid against the outside environment of the container 2. The container 2 has a usual capacity volume like that of known pressure containers for coating fluid.

In the container 2, preferably on its bottom 24, there is located a grounding contact 52, which is in contact with the coating fluid 6 in the container 2 and leads off the high voltage from the coating fluid 6 over an electric conduction path 53 with an electric resistor 54 to ground potential 56. The electric resistor 54 has a resistance value so high that the electrostatic charge of the coating fluid 6 before or after the atomizing at 34 and therewith the coating quality is not impaired. On the other hand the resistance value of the electric resistance 54 is such that after the switching-off of the electric high voltage of the electrodes 36 the capacitive electrical residual voltage present in the container 2 can in a short time flow off over this resistor 54 onto the ground potential 56. Therewith it is ensured that also after the switching-off of the high voltage on the electrodes 36 no capacitive voltages are any longer present on or in the container 2. The resistance value of the electric resistor 54 lies preferably between a few mega-ohms and several giga-ohms and is so great that on switching-off of the electric high voltage of the electrodes 36 the electric residual voltage present in the container 2 in less than six seconds has completely flowed off onto ground potential 56. For example, the resistor value of the resistance 54 can amount to a giga-ohm, so that after the switching-off of the high voltage, the discharge of the residual voltage over the resistor 54 takes only about two to three seconds. The grounding contact 52 can have any arbitrary form. It must have a good electrical contact to the coating fluid 6. The container base 48 consists preferably of an extension of the container wall 44 and extends from the container bottom 24 downward. In the hollow space 58 thereby formed under the container bottom 24 there is accommodated the resistor 54. Through the container base 48 of likewise electrically insulating material the container bottom 24 has a substantially greater spacing from the sub-base 42 than without such a container base 48.

Following upon the switch-off of the high voltage of the electrodes 36, after the residual voltage has flowed off in a few seconds over the resistor 54, the container cover 14 can be opened without danger by loosening of the screws 17, since no electrical voltage is any longer present on or in the container 2.

After the removal of the container cover 14, the container 2 can be refilled with coating fluid 6.

Figure 3:
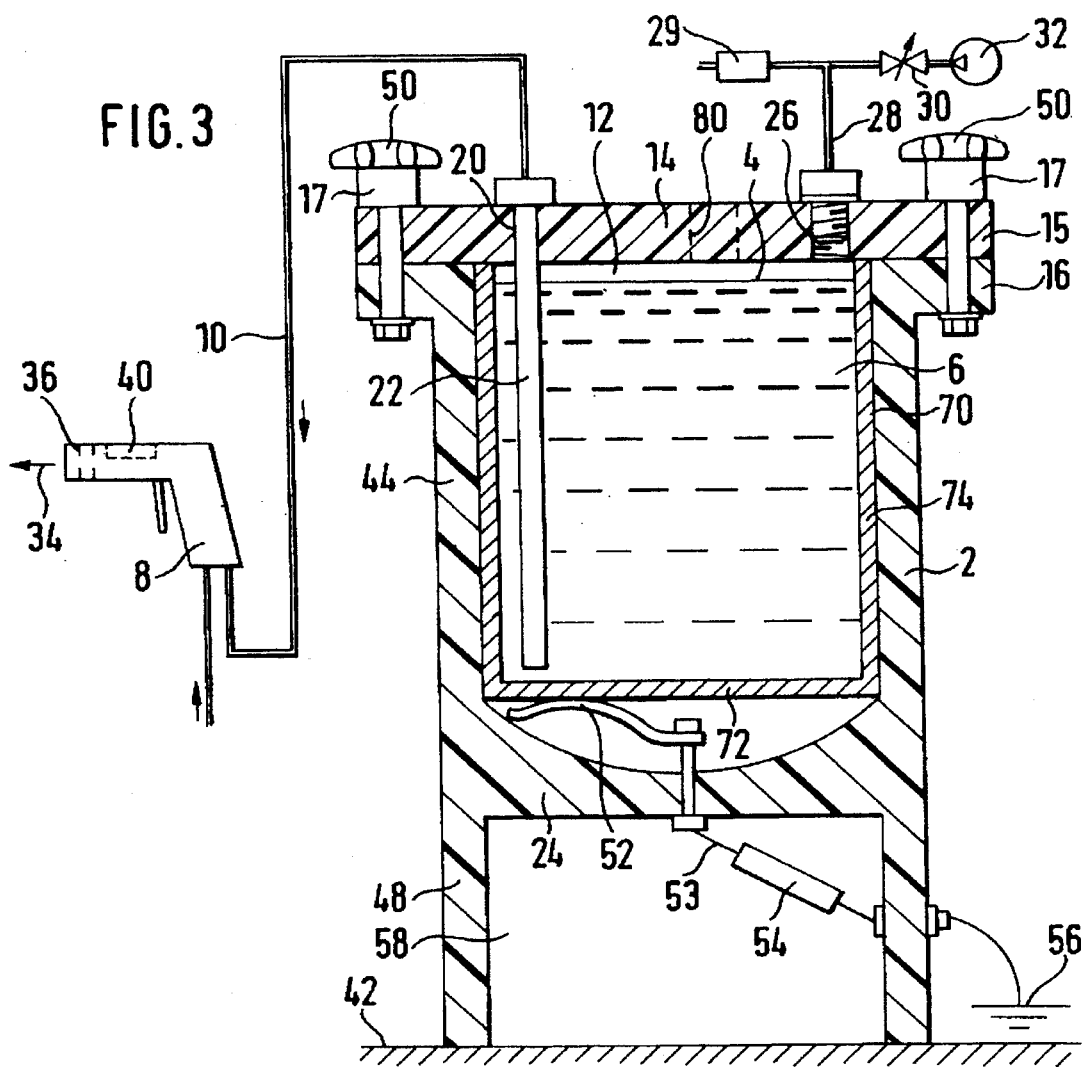

Instead of filling the container 2 directly with coating fluid, a supply container 70 can be installed in it, which contains the coating fluid 6. The precondition here according to FIG. 3 is merely that the supply container 70 consists at least partly of electrically conductive material, preferably the supply container bottom 72, and that this electrically conducting material 72 has contact with the grounding contact 52 and transfers the high voltage from the coating fluid 6 of the intermediate container 70 onto the grounding contact 52. In correspondence to FIG. 3, also the entire intermediate container may consist of metal. The intermediate container 70 can be tightly closed by the container cover 14, and the intermediate container mantle wall 74 can lie directly on the container wall 44 of the pressure container 2. The other details of FIG. 3 are the same as in FIGS. 1 and 2.

By the lead-off of the high voltage from the coating fluid 6 in the pressure container 2 through the resistor 54 to ground potential 56 it is ensured that after the switching-off of the high voltage the coating fluid present in the pressure container 2 is no longer electrically charged. Thereby immediately after the switching-off of the high voltage also the pressure container 2 can be opened, for example for the replenishing of coating fluid.

According to a modified form of execution according to the invention, instead of a resistor 54 there is provided a separating switch 55 in the grounding path between the grounding contact 52 and the ground potential 56, which on switching-on of the high voltage of the spraying device 8 is automatically opened and on switching-off of this high voltage is automatically closed. The separating switch 55, when it is closed, connects the grounding contact 52 electrically with the ground potential 56.

According to a further form of execution according to the invention, in the container cover 14 there is provided a closable opening or a line connection 80 for the filling of the pressure container 2 of FIG. 1 or supply container 70 of FIG. 3.

Figure 4:
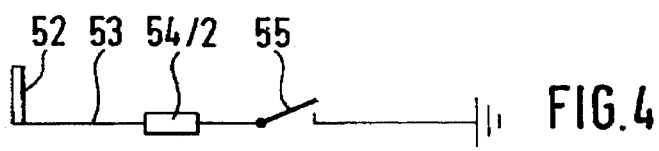
Figure 5:
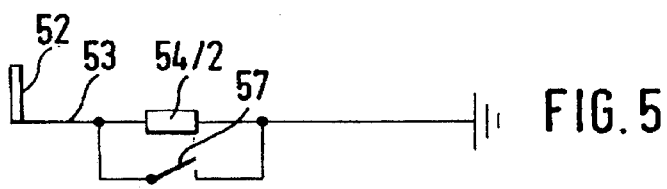
Figure 6:
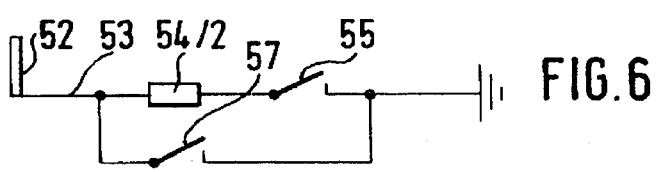

According to further forms of execution there can be provided both an electric resistor 54 and also a separating switch 57 in parallel and/or a separating switch 55 serially to the resistor 54 in the electrical conduction path 53 between the grounding contact 52 and the ground potential 56, as is schematically shown in FIGS. 4, 5 and 6.

I claim:

1. Electrostatic spray coating device for electrically conductive, non-combustible coating fluid, comprising: a pressure container (2) for the coating fluid (5), a spraying device (8) for atomizing and electrostatic charging of the coating fluid with high voltage, a tube (10) of electrically insulating material for feeding the coating fluid (5) from the pressure container (2) to the spraying device (8), at least one compressed air inlet (26) of electrically insulating material in the pressure container (2) above a maximal filling level (4) of the pressure container (2), at least one fluid outlet (20), which issues with spacing underneath the at least one compressed air inlet (26) into an interior of the container and to which there is connected the tube (10), the pressure container (2) formed of electrically insulating material which shields the high voltage of the electrically charged coating fluid (6) in the container (2) against the outside environment of the container (2), at least one grounding contact (52) is arranged in the container interior so that it is electrically connected with the coating fluid (6), an electric conduction path (53) is provided which connects the at least one grounding contact (52) for the electric discharge of the device and of the coating fluid with a ground potential (56) lying outside of the pressure container (2) electrically at least when the high voltage is switched off, the electric conduction path (53) having an electric resistor with a resistance in the range between the order of a mega ohm and a giga ohm and at least one separating switch which is automatically opened when the high voltage is switched-on, and wherein the separating switch is automatically closed when the high voltage is switched off.

2. Electrostatic spray coating device according to claim 1, wherein the at least one fluid outlet (20) includes an outlet tube (22) which is fastened to a container cover (14) and plunges in the container interior into the coating fluid (6).

3. Electrostatic spray coating device according to claim 2, wherein the pressure container (2) stands on an extension (48) of a container wall (44), which extends downward from a container bottom (24).

4. Electrostatic spray coating device according to claim 2, wherein in the interior of the container there is installed a supply container (70) which contains the coating fluid (6), into which the outlet tube (22) plunges and which consists at least in part of electrically conducting material which forms an electrical connection from the at least one grounding contact (52) to the coating fluid in the supply container (70).

5. Electrostatic spray coating device according to claim 1, wherein the pressure container (2) stands on an extension (48) of a container wall (44), which extends downward from a container bottom (24).

6. Electrostatic spray coating device according to claim 5, wherein the at least one fluid outlet (20) includes an outlet tube (22) which is fastened to a container cover (14) and plunges in the container interior into the coating fluid.

7. Electrostatic spray coating device according to claim 5, wherein in the interior of the container there is installed a supply container (70) which contains the coating fluid (6), into which an outlet tube (22) plunges and which consists at least in part of electrically conducting material which forms an electrical connection from the at least one grounding contact (52) to the coating fluid in the supply container (70).

8. Electrostatic spray coating device according to claim 1, wherein in the interior of the container there is installed a supply container (70) which contains the coating fluid (6), into which an outlet tube (22) plunges and which consists at least in part of electrically conducting material which forms an electrical connection from the at least one grounding contact (52) to the coating fluid in the supply container (70).

9. Electrostatic spray coating device according to claim 8, wherein the installed supply container (70) is a container open at the top, which is closed by a container cover (14) of the pressure container (2).

10. Electrostatic spray coating device according to claim 1, wherein the electrically insulating material is plastic.

\* \* \* \* \*